United States Patent [19]

Herzog

[11] 4,447,869

[45] May 8, 1984

[54] CONTROL CIRCUIT WITH AN AUXILIARY PROCESS VARIABLE

[75] Inventor: Rudolf Herzog, Tobel, Switzerland

[73] Assignee: Suzer Brothers Ltd., Winterthur, Switzerland

[21] Appl. No.: 317,283

[22] Filed: Nov. 2, 1981

[30] Foreign Application Priority Data

Nov. 11, 1980 [CH] Switzerland ............. 8352/80

[51] Int. Cl.³ .............. G05B 23/02; G05B 11/42
[52] U.S. Cl. ................. 364/184; 364/153; 364/158; 364/160
[58] Field of Search .......... 364/153, 160, 161, 162, 364/163, 172, 176, 183, 184, 185, 158; 318/563, 565, 590, 591, 609, 610

[56] References Cited

U.S. PATENT DOCUMENTS

| | | | |
|---|---|---|---|
| 3,922,535 | 11/1975 | Randolph | 364/160 |
| 4,071,897 | 1/1978 | Groves, Jr. et al. | 364/184 X |
| 4,214,301 | 7/1980 | Kurihara et al. | 364/185 |
| 4,344,128 | 8/1982 | Frye | 364/161 X |

Primary Examiner—Joseph F. Ruggiero
Attorney, Agent, or Firm—Kenyon & Kenyon

[57] ABSTRACT

The control circuit is provided with a signal transmitter for feeding a temporary disturbance signal to the controller 16, a selector which is selectively connected to the signal transmitter and a function transmitter and a disturbance indicator which switches the selector to the function transmitter in response to a signal from the signal transmitter falling outside a certain preset range of threshold values. The control of the circuit may be constructed in various manners.

5 Claims, 3 Drawing Figures

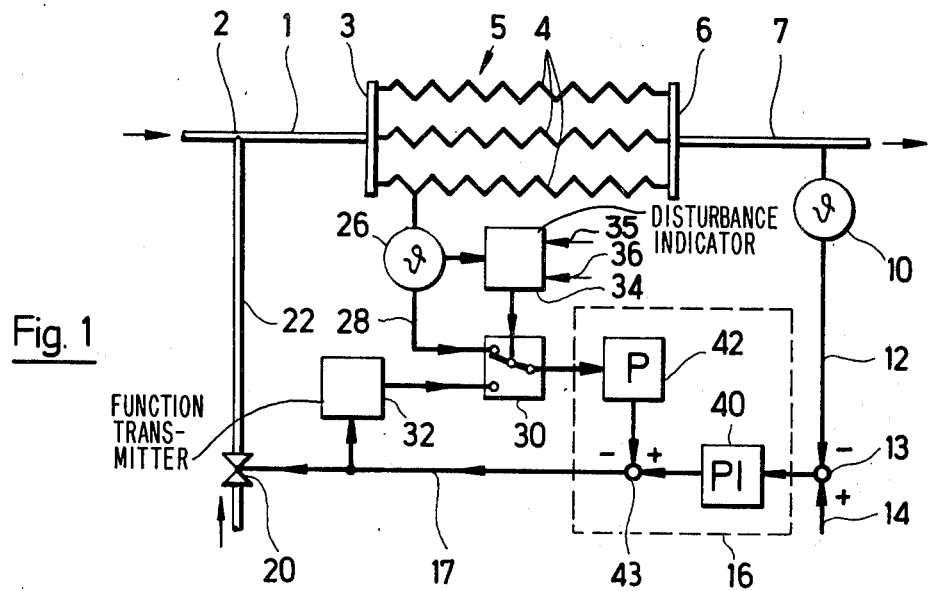
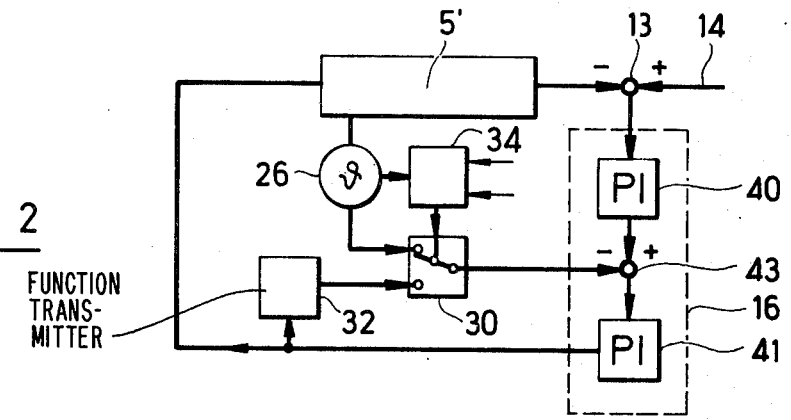
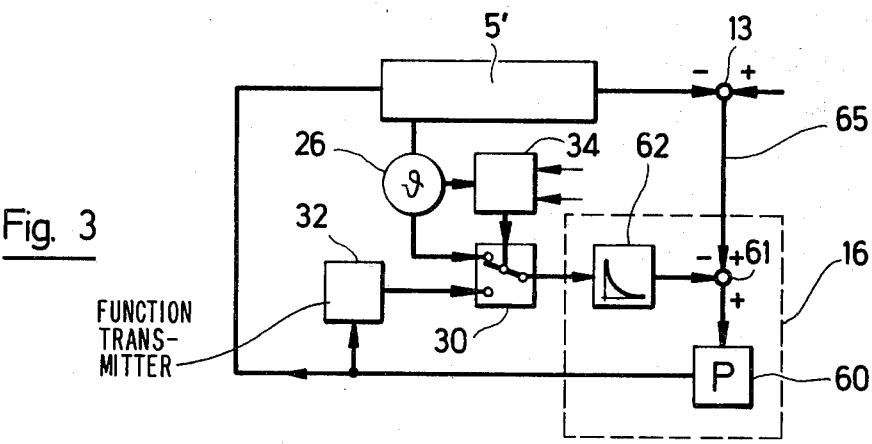

CONTROL CIRCUIT WITH AN AUXILIARY PROCESS VARIABLE

BACKGROUND OF THE INVENTION

This invention relates to a control circuit with an auxiliary process variable.

Heretofore, various types of control circuits have been known for controlling the output of a plant. For example, Swiss Pat. No. 369,780 describes a circuit with an auxiliary process variable for controlling the output temperature of a working medium flowing through a heat exchanger. As described, the heat exchanger has an input for receiving the working medium, a meter for emitting a signal corresponding to the output temperature as a process variable of the working medium, a controller for receiving the signal, a final control element which is connected to the controller in order to control the medium delivered to the heat exchanger and a signal transmitter which is connected to the heat exchanger near the input for emitting a second signal in response to an auxiliary process variable of the working medium. The use of the auxiliary process variable greatly improves the quality of the control. However, it has been found that when the controller is set to the optimum value for this circuit, dangerously high deviations may occur in the event of an absence of the auxiliary process variable signal.

While process variables can, in most cases, be measured without difficulty and with little likelihood of failure, it is often difficult to fit a signal transmitter for an auxiliary process variable. In the case of the control circuit described in the above-noted Swiss Patent, the measuring point for the auxiliary process variable must be disposed inside a housing of the heat exchanger. As a result, the likelihood of failure is relatively high because of the unfavorable situation of the measuring point.

It is obvious that the increased liability of the signal transmitter to malfunction can be counteracted by providing a second, and possibly a third signal transmitter for the auxiliary process variable and to feed these signals from these transmitters to the controller by way of one of the known redundancy circuits. However, a solution of this kind is not only expensive but also increases the probability of a disturbance occurring which would result in the need for repairs and, possibly, shutdown of the plant housing the heat exchanger.

Accordingly, it is an object of the invention to improve a control circuit having an auxiliary process variable at moderate expense and with a minimum of failure probability.

It is another object of the invention to provide a control circuit for a plant in which an auxiliary process variable is monitored so that dangerous deviations are minimized in the event of failure of the auxiliary process variable signal.

It is another object of the invention to be able to modify existing control circuits which monitor auxiliary process variables in a relatively economic manner to avoid dangerous deviations which may occur in the event of failure of an auxiliary process variable signal.

Briefly, the invention is directed to a control circuit for controlling a plant having an input for receiving a medium to be processed therein. The control circuit includes a meter for emitting a signal corresponding to a process variable of the medium processed in the plant, a controller having an input connected to the meter for receiving the signal and an output for emitting a control signal, a final control element connected to the controller output to receive the control signal for controlling the medium delivered to the plant and a signal transmitter connected to the plant near the plant input for emitting a second signal in response to an auxiliary process variable of the medium. In accordance with the invention, the control circuit is provided with a selector, a function transmitter and a disturbance indicator.

The selector has a pair of inputs and an output. One of the selector inputs is connected to the signal transmitter in order to receive the auxiliary process variable signal while the output is connected between this selector input and the second controller input in order to deliver the signal thereto.

The function transmitter is connected to and between the controller output and a second selector input in order to deliver the control signal from the controller output to the selector.

The disturbance indicator is connected to and between the signal transmitter and the selector in order to switch the selector output to the selector input connected to the function transmitter in response to an output signal from the signal transmitter falling below a bottom threshold value or above a top threshold value. Upon actuation of the disturbance indicator, the controller is then influenced by the function transmitter instead of by the signal transmitter.

One particular advantage of the control circuit is that the selector, function transmitter and disturbance indicator can be incorporated in the controller itself. In this case, no additional connecting lines are required.

The control circuit can be constructed with different controllers. For example, in one embodiment, the controller includes a first network of at least I-type which is connected to the controller input receiving the signal from the meter, a second network of at least P-type connected to the controller input receiving a signal from the selector and a subtraction point connected to the networks to form a final control signal of the received signals in the networks. In this embodiment, the control circuit is particularly simple.

In another embodiment, the controller may have a network of at least I-type connected to the controller input which receives the signal from the meter, a subtraction point connected to the network to receive an integral action signal therefrom and to the selector output to receive a signal and a second network of at least I-type connected between the subtraction point and the controller output. A control circuit with a controller of this type offers additional adjustment facilities so that better optimization is possible.

In still another embodiment, the controller may include a P-network connected to and between the controller input receiving a signal from the meter and the controller output as well as a D-network connected to the selector output and to the P-network for feeding a derivative action signal negatively to the P-network corresponding to the signal from the selector. The advantage of this control circuit is that no provision has to be made to prevent a runaway of the controller output signal. However, one disadvantage of this control circuit is that it may lead to a permanent small deviation. In order to obviate this disadvantage, a PI-network can be connected to and between the plant output and the controller input receiving the process variable signal.

These and other objects and advantages of the invention will become more apparent from the following detailed description taken in conjunction with the accompanying drawings in which:

FIG. 1 schematically illustrates a control circuit according to the invention;

FIG. 2 illustrates a modified control circuit according to the invention; and

FIG. 3 illustrates a further modified control circuit according to the invention.

Referring to FIG. 1, the control circuit is used for controlling a working medium flowing through a plant such as a super-heater 5.

As illustrated, the super-heater 5 has an input in the form of a header 3 which receives a flow of super-heated steam from a connecting pipe 1. The super-heater 5 has a plurality of lines, for example, three lines 4, each of which leads into a header 6 which forms an output of the super-heater 5. The header 6 is, in turn, connected with an outlet pipe 7 from which super-heated steam may flow. As indicated, the connecting pipe for the incoming steam has an injection point 2 at which a stream of injected water may be introduced via a line 22 in order to control the temperature of the steam.

The control circuit includes a meter 10 which is connected to the outlet pipe 7 for measuring the steam temperature in the pipe 7 and for emitting a signal corresponding to this process variable of the working medium. The measured signal is fed via a line 12 to a comparison point 13 where the signal is compared to a set value signal fed into the comparison point 13 via a line 14 in order to obtain a signal representative of the deviation of the measured value from the set value. This deviation signal is then fed to a controller 16 of the control circuit which has an output which acts via a line 17 on a final control element 20, for example in the form of an injection valve 20 in the line 22.

The controller 16 has a pair of inputs and an output. One input is connected to the comparison point 13 to receive the deviation signal and to deliver the signal to a network of at least I-type, for example a PI-network 40. The second input is connected with a network of at least P-type, for example a P-network 42. The outputs of the two networks 40, 42 are each connected to a subtraction point 43 at which a differential signal is produced by a subtraction of the outputs of the two networks 40, 42. This resulting differential signal is then fed to the output of the controller 16 and emitted as a control signal via the line 17 to the final control element 20.

The final control element 20 serves to control the steam delivered to the super-heater 5 by the injection of water via the line 22.

In order to obtain an auxiliary process variable, the control circuit has a signal transmitter 26 connected to the super heater 5 near the input header 3 in order to emit a water temperature signal which forms an auxiliary process variable. As indicated, the transmitter 26 is connected to one of the lines 4 of the super heater 5 near the header 3. In addition, the signal transmitter 26 is connected to an input of a two-input selector 30 in order to deliver the auxiliary signal thereto. The output of the selector is, in turn, connected to the input of the controller 16 connected with the P-network 42.

In addition, the control circuit has a function transmitter 32 and a disturbance indicator 34. The function transmitter 32 is connected to and between the line 17 from the controller 16 and the second input of the selector 30 in order to deliver the control signal from the controller output to the second selector input. The disturbance indicator 34 is connected to and between the signal transmitter 26 and the selector 30 in order to switch the selector output to the selector input connected to the function transmitter 32 in response to an output signal from the signal transmitter 26 falling below a bottom threshold value or above a top threshold value. To this end, the disturbance indicator 34 compares a signal of the transmitter 26 with a top threshold value delivered via a line 35 and a bottom threshold value delivered via a line 36. Alternatively, these delivered values may be permanently set.

In normal operation, the control circuit operates as follows. If the temperature of the steam in the outlet pipe 7 from the super-heater 5 rises, the water supply at the injection point 2 is increased via the PI-network 40. If the temperature of the water entering the super-heater 5 rises, this is rapidly determined by the signal transmitter 26 and a corresponding auxiliary process variable signal is fed to the selector 30. If the delivered signal is within the defined threshold range, the signal is delivered as a disturbance variable input to the controller 16, i.e., to the network 42. As a result, the controller 16 emits a signal via the line 17 to the valve 20 so that the amount of water injected is rapidly corrected.

The function transmitter 32 is so adjusted as to have approximately the same amplification factor as that section of the control circuit which extends from the output of the controller 16 as far as the output of the signal transmitter 26.

In the event of a short circuit or open circuit at the signal transmitter 26, the signal from a transmitter 26 will exceed the top threshold or will fall below the bottom threshold values in the indicator 34. The indicator 34 thus switches the selector 30 to the function transmitter 32. Since the output of the function transmitter 32 does not coincide exactly with the output of the signal transmitter 26, a temporary disturbance is associated with this changeover. However, the temporary disturbance is small in comparison with the effect that a breakdown of the auxiliary control circuit would have on the control behavior of the complete control system if there were not feedback via the function transmitter 32. Thus, the control circuit greatly improves the control quality in the event of a disturbance.

The signal emitted by the signal transmitter 26 is additionally fed to the controller 16 to act as an auxiliary controlled variable.

Advantageously, the disturbance indicator 34, selector 30 and function transmitter 32 can, without difficulty, be accommodated within a housing of the controller 16. In this case, there is a reduction in the number of connections required.

The control circuit is intended for increased operational reliability, but does not cause any increase in the number of disturbances.

Referring to FIG. 2 wherein like reference characters indicate like parts as above, the controlled plant 5' is controlled via a circuit which includes a controller 16 having two PI-networks 40, 41 connected in series. As illustrated, one PI-network 40 is connected to the input of the controller receiving the deviation signal from the comparison point 13 and has an output connected to a subtraction point 43 so as to deliver an integral action signal thereto. The subtraction point 43 is also connected to the output of the selector 30 to receive a signal therefrom for comparison with the signal from the network 40. The second PI-network 41 thus has an integral control action which receives a much higher input than the network 40 for stability reasons. The control circuit thus provides a better optimization than the control circuit of FIG. 1.

Referring to FIG. 3, wherein like reference characters indicate like parts as above, the control circuit may have a controller 16 provided with a P-network 60 and a D-network 62 which delivers a derivative action signal. The D-network 62 is connected between the output of the selector 30 and a subtraction point 61 within the controller 16. The subtraction point 61 also receives the deviation signal from a comparison point 13 via a line 65 connected to an input of the controller 16. The output of the subtraction point 61 is, in turn, connected to the P-network 60. The advantage of this embodiment of the controller 16 is that no special means are required for limiting the output signal of the controller 16 to prevent winding-up of the integrator.

If the permanent deviation of the P-network causes a disturbance in the control circuit, a PI-network can be disposed in the line 65.

Alternatively, instead of feeding the derivative action signal to the subtraction point 61, the signal can be fed negatively directly to the input of the P-network 60.

It is to be noted that the control circuits are not confined to the exemplified embodiments illustrated. For example, other networks, particularly D-networks, may be provided.

It is also noted that the disturbance indicator 34 may also act on a disturbance panel or an alarm.

What is claimed is:

1. In combination
   a controlled plant having an input for receiving a medium to be processed therein;
   a meter for emitting a first signal corresponding to a process variable of the medium processed in said plant;
   a controller having a pair of inputs and an output, one of said inputs being connected to said meter to receive said first signal;
   a final control element connected to said controller output to receive a control signal therefrom for controlling the medium delivered to said plant;
   a signal transmitter connected to said plant near said plant input for emitting a second signal in response to an auxiliary process variable of the medium;
   a selector having a pair of inputs and an output, one of said selector inputs being connected to said signal transmitter to receive said second signal and said selector output being connected between said one selector input and a second of said controller inputs to deliver said second signal thereto;
   a function transmitter connected to and between said controller output and a second of said selector inputs to deliver the control signal from said controller output to said second selector input; and
   a disturbance indicator connected to and between said signal transmitter and said selector to switch said selector output to said second selector input in response to an output signal from said signal transmitter falling below a bottom threshold value or above a top threshold value.

2. The combination as set forth in claim 1 wherein said controller includes a first network of at least I-type connected to said one controller input to receive said first signal, a second network of at least P-type connected to said second controller input to receive a selected one of said second signal and said control signal, and a subtraction point connected to said networks to form a final control signal of the received signals in said networks.

3. The combination as set forth in claim 1 wherein said controller includes a first network of at least I-type connected to said one controller input to receive said first signal, a subtraction point connected to said network to receive an integral action signal therefrom and to said selector output to receive a selected one of said second signal and said control signal therefrom, and a second network of at least I-type connected between said subtraction point and said controller output.

4. The combination as set forth in claim 1 wherein said controller includes a P-network connected to and between said one controller input and said controller output and a D-network connected to said selector output and to said P-network for feeding derivative action signal negatively to said P-network corresponding to a selected one of said second signal and said control signal.

5. The combination as set forth in claim 4 which further comprises a PI-network connected to and between said plant output and said one controller input.

* * * * *

UNITED STATES PATENT AND TRADEMARK OFFICE
CERTIFICATE OF CORRECTION

PATENT NO. : 4,447,869

DATED : May 8, 1984

INVENTOR(S) : Rudolf Herzog

It is certified that error appears in the above—identified patent and that said Letters Patent is hereby corrected as shown below:

On the Front Page - Item 73, change "Suzer" to --Sulzer--

Signed and Sealed this

Sixteenth Day of October 1984

[SEAL]

Attest:

GERALD J. MOSSINGHOFF

Attesting Officer

Commissioner of Patents and Trademarks